US010514873B2

(12) United States Patent
Suehiro (10) Patent No.: US 10,514,873 B2
(45) Date of Patent: Dec. 24, 2019

(54) IMAGE PROCESSING APPARATUS, PRINTING SYSTEM, IMAGE PROCESSING METHOD, STORAGE MEDIUM, AND PRINTING METHOD

(71) Applicant: SEIKO EPSON CORPORATION, Tokyo (JP)

(72) Inventor: Konatsu Suehiro, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/027,455

(22) Filed: Jul. 5, 2018

(65) Prior Publication Data
US 2019/0012125 A1 Jan. 10, 2019

(30) Foreign Application Priority Data
Jul. 7, 2017 (JP) .................................. 2017-133418

(51) Int. Cl.
*G06F 3/12* (2006.01)
(52) U.S. Cl.
CPC .......... *G06F 3/1259* (2013.01); *G06F 3/1219* (2013.01); *G06F 3/1239* (2013.01); *G06F 3/1241* (2013.01); *G06F 3/1254* (2013.01)
(58) Field of Classification Search
CPC .... G06F 3/1259; G06F 3/1254; G06F 3/1239; G06F 3/1219; G06F 3/1241
USPC ...................................................... 358/1.13
See application file for complete search history.

(56) References Cited

U.S. PATENT DOCUMENTS

| 8,035,836 | B2 * | 10/2011 | Kuhn | .................... G06F 3/1204 358/1.13 |
| 2011/0211892 | A1 * | 9/2011 | Yasuzaki | .................... B41J 3/60 400/76 |
| 2013/0163008 | A1 * | 6/2013 | Edwards | ............... G06F 3/1219 358/1.6 |
| 2015/0378646 | A1 * | 12/2015 | James | .................... G06F 3/126 358/1.15 |

FOREIGN PATENT DOCUMENTS

JP 2002-091748 A 3/2002

* cited by examiner

*Primary Examiner* — Neil R McLean
(74) *Attorney, Agent, or Firm* — Workman Nydegger (57) ABSTRACT

An image processing apparatus includes: a print job generator configured to perform optimization processing for optimizing an arrangement of a plurality of images and generate a print job instructing a printer to print the plurality of optimized images; an interruption detector configured to detect an interruption of the print job; and a reprint job generator configured to generate a reprint job instructing the printer to print unprinted images, of which printing is not completed, among the plurality of images if the interruption detector detects the interruption of the print job. The reprint job generator executes a first mode that performs the optimization processing on the unprinted images, of which the printing is not completed, among the plurality of images and generates, as the reprint job, a first reprint job instructing the printing of the unprinted images on which the optimization processing is performed.

7 Claims, 7 Drawing Sheets

IMAGE PROCESSING APPARATUS, PRINTING SYSTEM, IMAGE PROCESSING METHOD, STORAGE MEDIUM, AND PRINTING METHOD

The entire disclosure of Japanese Patent Application No. 2017-133418, filed Jul. 7, 2017 is incorporated by reference herein.

BACKGROUND

1. Technical Field

The present invention relates to a technique to control an arrangement of a plurality of images to be printed.

2. Related Art

In JP-A-2002-091748, a print job is divided at page breaks, thus the print job is divided into a plurality of divided jobs, and each of the divided jobs is transferred to a printer.

In a printer, there are cases where a print job is interrupted due to cleaning, running out of paper (printing medium), running out of ink, or the like. When the interruption of the print job occurs, in the printer having the concept of pages as described in JP-A-2002-091748, reprinting may be executed from the page where the print job is interrupted. However, in the printer that executes printing while transporting paper, for example, in a roll-to-roll manner, since there is no concept of pages, the technique is not able to be applied. Therefore, it is necessary to execute the print job again from the beginning, and a large amount of waste occurs in a printing time and paper consumption, and therefore the print job is not executed efficiently in some cases.

SUMMARY

An advantage of some aspects of the invention is to provide a technique capable of effectively executing a print job even when the print job is interrupted.

According to a first aspect of the invention, an image processing apparatus includes: a print job generator configured to perform optimization processing for optimizing an arrangement of a plurality of images and generate a print job instructing a printer to print the plurality of images on which the optimization processing is performed; an interruption detector configured to detect an interruption of the print job; and a reprint job generator configured to generate a reprint job instructing the printer to print unprinted images, of which printing is not completed, among the plurality of images if the interruption detector detects the interruption of the print job. The reprint job generator executes a first mode that performs the optimization processing on the unprinted images, of which the printing is not completed, among the plurality of images and generates, as the reprint job, a first reprint job instructing the printer to print the unprinted images on which the optimization processing is performed.

According to a second aspect of the invention, a printing system includes: an image processing apparatus configured to perform optimization processing for optimizing an arrangement of a plurality of images and generate a print job instructing a printer to print the plurality of images on which the optimization processing is performed; a printer to execute the print job. If an interruption of the print job is detected in the printer, the image processing apparatus executes a mode that performs the optimization processing on unprinted images, of which printing is not completed, among the plurality of images and generates a reprint job instructing the printer to print the unprinted images on which the optimization processing is performed.

According to a third aspect of the invention, an image processing method includes: performing optimization processing for optimizing an arrangement of a plurality of images and generating a print job instructing a printer to print the plurality of images on which the optimization processing is performed; detecting an interruption of the print job; and executing a mode that performs the optimization processing on unprinted images, of which printing is not completed, among the plurality of images and generates a reprint job instructing the printer to print the unprinted images on which the optimization processing is performed, if the interruption of the print job is detected.

According to a fourth aspect of the invention, a non-transitory computer-readable storage medium storing an image processing program causing a computer to execute a process including: performing optimization processing for optimizing an arrangement of a plurality of images and generating a print job instructing a printer to print the plurality of images on which the optimization processing is performed; detecting an interruption of the print job; and executing a mode that performs the optimization processing on unprinted images, of which printing is not completed, among the plurality of images and generates a reprint job instructing the printer to print the unprinted images on which the optimization processing is performed, if the interruption of the print job is detected.

According to a fifth aspect of the invention, a printing method includes: performing optimization processing for optimizing an arrangement of a plurality of images and generating a print job instructing a printer to print the plurality of images on which the optimization processing is performed; executing, by a printer, the print job; detecting an interruption of the print job; executing a mode that performs the optimization processing on unprinted images, of which printing is not completed, among the plurality of images, and generates a reprint job instructing the printer to print the unprinted images on which the optimization processing is performed, if the interruption of the print job is detected; and executing, by the printer, the reprint job.

The aspects of the invention (image processing apparatus, printing system, image processing method, image processing program, and printing method) configured as described above performs the optimization processing for optimizing the arrangement of the plurality of images to generate the print job that instructs a printer to print the plurality of images on which the optimization processing is performed. If the interruption of the print job is detected, the first mode (mode) that performs the optimization processing on the unprinted images and generates the first reprint job (reprint job) instructing the printer to print the unprinted images on which the optimization processing is performed is executed. Accordingly, even when the print job is interrupted, it is unnecessary to execute the print job again from the beginning. In addition, in the first mode, since the arrangement of the unprinted images is optimized by the optimization processing, it is also possible to reduce the waste of the printing medium. According to the invention, even when the print job is interrupted, it is possible to efficiently execute the print job.

Furthermore, the image processing apparatus may be configured so that if the interruption detector detects the interruption of the print job, the reprint job generator can selectively execute the first mode or a second mode, which generates, as the reprint job, a second reprint job instructing the printer to print the unprinted images while maintaining the arrangement of the unprinted images among the plurality of images in the print job. In such a configuration, it is possible to execute the reprint job with high versatility such as selecting the first mode when it is important to reduce the waste of the printing medium and selecting the second mode when it is important to arrange the plurality of images appropriately.

In addition, the image processing apparatus may further include an arrangement input section to which a user inputs an instruction of arranging the images, in which the image processing apparatus may be configured so that the print job generator executes an arrangement adjustment that adjusts an arrangement of the plurality of images based on the instruction of arranging the images and the reprint job generator executes the first mode when the print job generator does not execute the arrangement adjustment. Thus, it is possible to restrain the instruction of arranging the images by the user from being canceled due to the execution of the first mode.

In addition, the image processing apparatus may be configured so that the reprint job generator executes the second mode when the print job generator executes the arrangement adjustment. In such a configuration, it is possible to restrain the arrangement of the unprinted images from being changed against the instruction of arranging the images by the user.

Further, the image processing apparatus may be configured so that the arrangement input section receives change permission information, input by the user, indicating whether to change the arrangement of the images determined by the instruction of arranging the images and the reprint job generator selects a mode to be executed out of the first mode and the second mode based on the change permission information when the print job generator executes the arrangement adjustment. In such a configuration, it is possible to execute the appropriate mode (first mode and second mode) according to the user's intention.

In addition, the image processing apparatus may be configured so that the interruption detector detects the interruption of the print job in the printer that prints the images on the printing medium while transporting the printing medium in a first direction to execute the print job, the arrangement input section receives, as the instruction of arranging the images, a setting instruction of an unprinted area extending through the printing medium in a second direction orthogonal to the first direction, the print job generator avoids the unprinted area and arranges the images when there is the setting instruction, and the reprint job generator generates the second reprint job instructing the printer to print the images on an upstream side in the first direction of the unprinted area closest to the unprinted images on a downstream side in the first direction of the unprinted images and executes the second mode. In such a configuration, when the print job is interrupted, the printing is restarted from the unprinted area closest to the unprinted image, the printing of all the images related to the print job is not necessarily executed again, and it is possible to execute the reprint job while maintaining the positional relationship of the unprinted images.

In addition, the image processing apparatus may be configured so that the reprint job generator allows another printer different from the printer to execute the reprint job when the printer executing the print job is not available to be used. In such a configuration, it is possible to execute the reprint job even when the printer, which is executing the print job, is not available to be used.

BRIEF DESCRIPTION OF THE DRAWINGS

The invention will be described with reference to the accompanying drawings, wherein like numbers reference like elements.

DESCRIPTION OF EXEMPLARY
EMBODIMENTS

Figure 1:
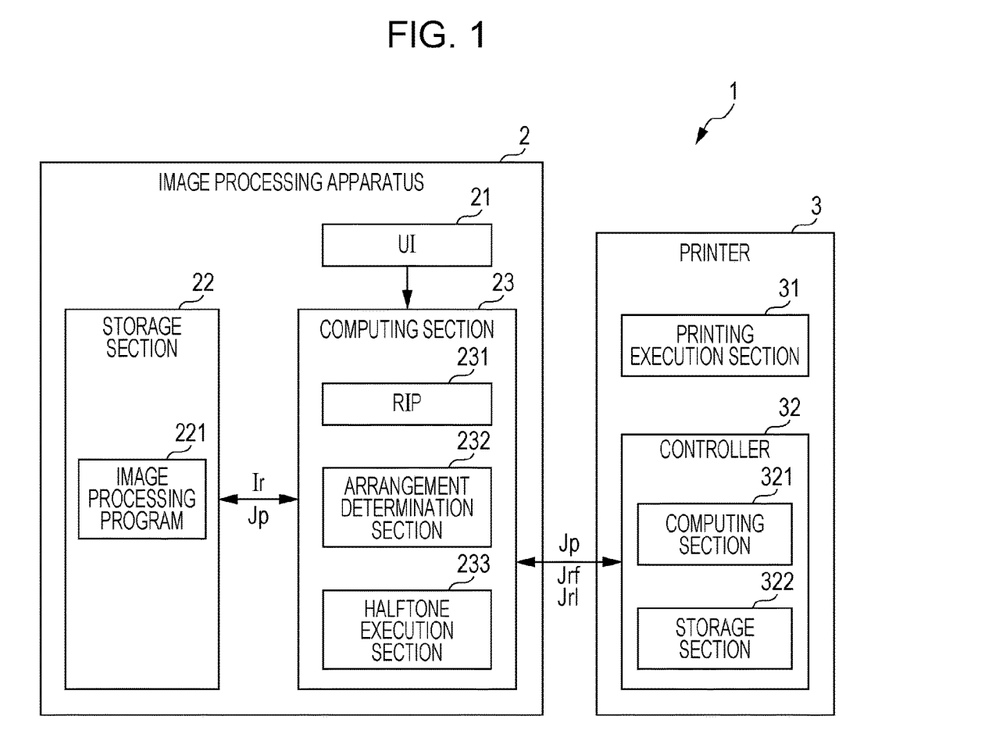
FIG. 1 is a diagram illustrating an example of a printing system according to the invention.

FIG. 1 is a diagram illustrating an example of a printing system according to the invention. A printing system 1 includes an image processing apparatus 2 that generates a print job Jp and a printer 3 that executes printing based on the print job Jp. It should be noted that the number of printers 3 connected to the image processing apparatus 2 in the printing system 1 is not limited to one, but a plurality of printers 3 can be connected to the image processing apparatus 2. The image processing apparatus 2 is, for example, a personal computer, and includes a user interface (UI) 21, a storage section 22, and a computing section 23. The UI 21 is configured of input devices such as a mouse and a keyboard and output devices such as a display, and accepts an input operation by a user or displays information to the user. It should be noted that the UI 21 may be a touch panel integrally configured with the input device and the output device. The storage section 22 is configured of a hard disc drive (HDD), and stores software (image processing program 221 or the like) and various data that are installed in the image processing apparatus 2. The computing section 23 is configured of a central processing unit (CPU) and a random access memory (RAM), and performs, for example, operations defined in software.

In the image processing apparatus 2, if a user inputs a print instruction, which instructs a printer on printing of a plurality of images, to the UI 21, the computing section 23 generates the print job Jp instructing a printer to print the plurality of images indicated by the print instruction, and outputs the print job Jp to the printer 3. The computing section 23 executes software to construct a raster image processor (RIP) 231, an arrangement determination section 232, and a halftone execution section 233, and generates the print job Jp by cooperation thereof. It should be noted that a specific method of generating the print job Jp will be described later with reference to FIGS. 3 and 4.

The printer 3 includes a print execution section 31 that is a mechanical configuration for executing printing and a controller 32 that controls the operation of the printing execution section 31. The controller 32 has a computing section 321 and a storage section 322. The computing section 321 is configured of the CPU and the RAM, and executes operations required to control the printing execution section 31. The storage section 322 is configured of a HDD and stores the print job Jp received from the image processing apparatus 2.

Figure 2:
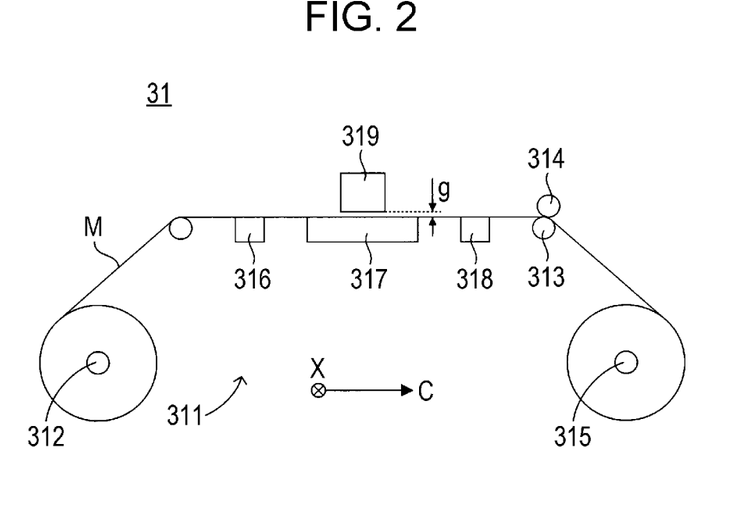
FIG. 2 is a diagram schematically illustrating an example of a printing execution section of a printer.

FIG. 2 is a diagram schematically illustrating an example of a printing execution section of a printer. The printing execution section 31 of the printer 3 has a transport section 311 that transports a printing medium M (roll paper) in a transporting direction C by roll-to-roll manner. The transport section 311 has a delivery roller 312, a pair of rollers 313 and 314, and a winding roller 315 that are arranged in order in the transporting direction C of the printing medium M. The delivery roller 311 delivers the printing medium M, which is wound in a roll shape, in the transporting direction C. The printing medium M delivered by the winding roller 315 is pinched between the pair of rollers 313 and 314. The roller 314 is biased by the roller 313 and applies a constant load to the printing medium M, whereas the roller 313 applies a predetermined torque to the printing medium M to transport the printing medium M in the transporting direction C while applying a constant tension to the printing medium M. Then, the winding roller 315 winds the printing medium M from the pair of rollers 313 and 314.

Further, the printer 3 has a preheater 316, a platen heater 317, and an after-heater 318 that are arranged in order in the transporting direction C between the delivery roller 312 and the roller 313, and heats the printing medium M that contacts upper surfaces of the preheater 316, the platen heater 317, and the after-heater 318. In addition, the printer 3 has a print head 319 that faces the platen heater 317 with a predetermined platen gap g therebetween. The print head 319 has a plurality of nozzles that are open on a surface (nozzle forming surface) facing the platen heater 317, and ejects ink from each nozzle by an ink jet method. The print head 319 can eject ink in a range in the printing medium M to which the plurality of nozzles is opposed, that is, an ink landing range.

In such a printer 3, the transport section 311 intermittently transports the printing medium M in the transporting direction C to send an unprinted area of the printing medium M onto the platen heater 317. The print head 319 executes main scanning that ejects ink while moving in a scanning direction X orthogonal to the transporting direction C. At this time, the number of times (the number of passes) of executing the main scanning by the print head 319 can be set appropriately, and the print head 319 executes the main scanning by the set number of passes. In this way, the print head 319 executes the main scanning under a control of a controller 32, and thus an image indicated by the print job Jp is printed on the printing medium M that stops at the platen heater 317. In this way, the main scanning is executed on the stopped printing medium M by the predetermined number of passes every time the printing medium M is transported intermittently, and therefore the image is printed on the long printing medium M in the transporting direction C.

Figure 3:
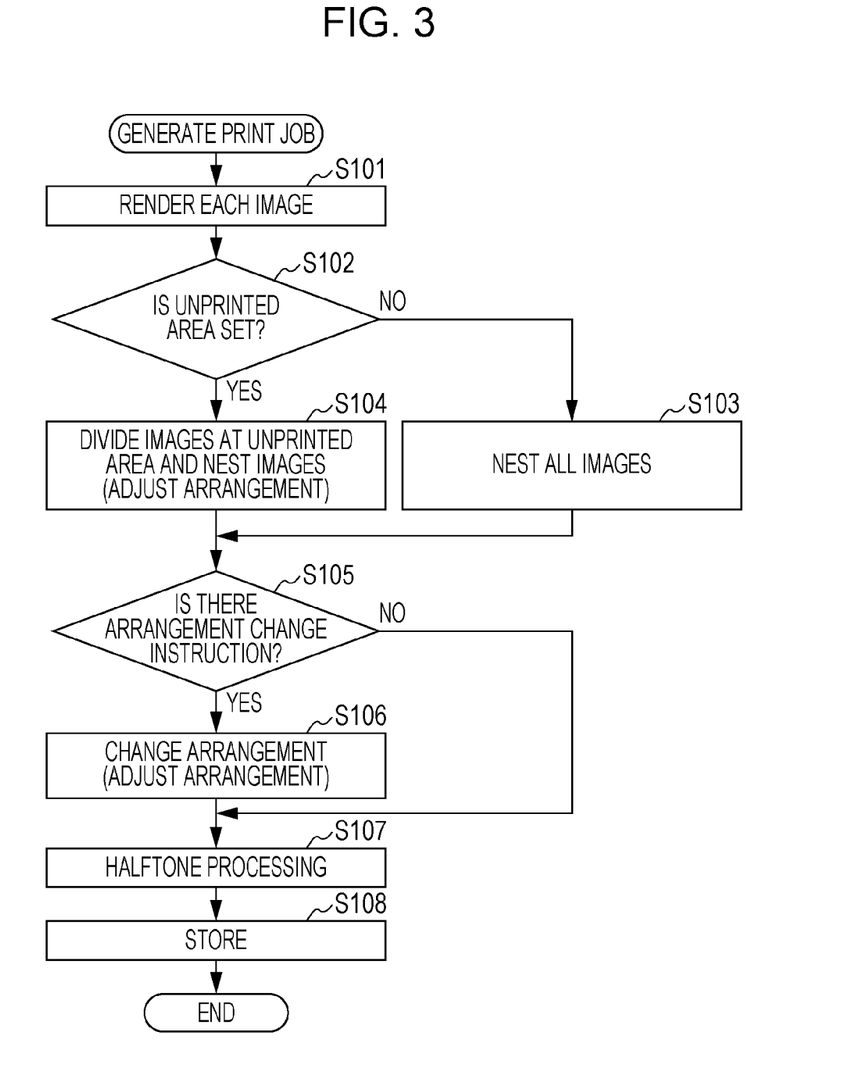
FIG. 3 is a flowchart illustrating a method of generating a print job executed by an image processing apparatus.
Figure 4:
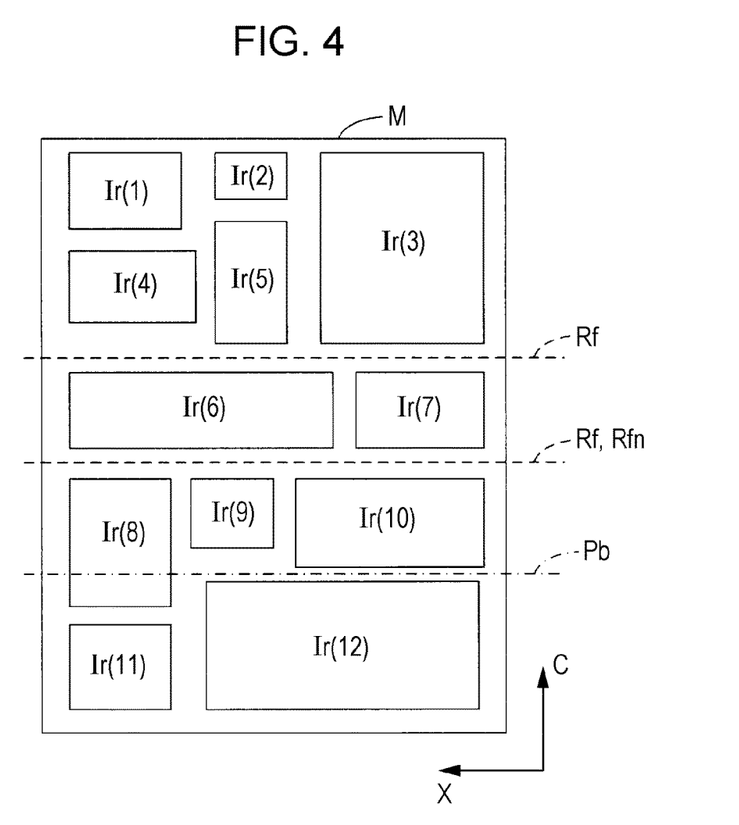
FIG. 4 is a diagram illustrating an example of an operation executed according to the flowchart of FIG. 3.

FIG. 3 is a flowchart illustrating an example of a method of generating a print job executed by the image processing apparatus, and FIG. 4 is a diagram schematically illustrating an example of the operation executed according to the flowchart of FIG. 3. It should be noted that the example of FIG. 4 corresponds to a case in which the print instruction instructing a printer to print 12 images is input to the UI 21.

In step S101, the RIP 231 executes rendering (rasterization) on each of a plurality of images indicated by the print instruction input to the UI 21 to generate raster images Ir, that is, raster images Ir(1) to Ir(12) of the 12 images. These raster images Ir(1) to Ir(12) are stored in the storage section 22.

Next, the arrangement determination section 232 determines the arrangement of the plurality of raster images Ir. Upon the arrangement determination, the arrangement determination section 232 determines whether to set an unprinted area Rf (FIG. 4) (step S102). That is, a user operates the UI 21 to be able to give a group division instruction (arrangement instruction), and thus the plurality of images are divided into several groups and arranged. When there is the group division instruction, the arrangement determination section 232 sets the unprinted area Rf between different groups. As illustrated in FIG. 4, the unprinted area Rf is an imaginary straight line extending parallel to the scanning direction X through the printing medium M.

When the setting of the unprinted area Rf is not required (in the case of "NO" in step S102), the arrangement determination section 232 executes nesting on all the raster images Ir(1) to Ir(12) (step S103). Here, the nesting is operation processing for determining the arrangement of the targeted raster images Ir (here, the raster images Ir(1) to Ir(12)) in order to reduce a margin, and the arrangement of the targeted raster images Ir is optimized by the execution of the nesting.

On the other hand, when the setting of the unprinted area Rf is required (in the case of "YES" in step S102), the arrangement determination section 232 executes the nesting on raster images Ir for each of the ranges divided at the unprinted area Rf. That is, in the example of FIG. 4, a group division instruction by the user, which divides five raster images Ir(1) to Ir(5), two raster images Ir(6) and Ir(7), and five raster images Ir(8) to Ir(12) into groups and arranges the groups, is indicated. The raster images Ir(1) to Ir(12) are nested (arrangement adjustment) so that the raster images of different groups are divided by the unprinted area Rf. In this way, the raster images Ir(1) to Ir(12) are arranged avoiding the unprinted area Rf.

In step S105, the arrangement determination section 232 checks whether an arrangement change instruction (arrangement instruction) for changing the arrangement of the nested raster images IR is input to the UI 21. When there is the input of the arrangement change instruction (in the case of "YES" in step S105), in step S106, the arrangement determination section 232 changes the arrangement of the raster images Ir according to the arrangement change instruction (arrangement adjustment), and the process proceeds to step S107. Meanwhile, when there is no input of the arrangement change instruction (in the case of "NO" in step S105), the process proceeds to step S107.

In step S107, the halftone execution section 233 executes halftone processing on the whole image including the plurality of raster images Ir(1) to Ir(12) whose arrangement is determined, thereby generating the print job Jp. The print job Jp is stored in the storage section 22 (step S108), and the generation of the print job Jp is completed. The generated print job Jp is read from the storage section 22 and is transferred to the printer 3, and the printer 3 prints a plurality of images according to the instruction of the print job Jp.

In some cases, the print job Jp may be interrupted during being executed. The cause of the interruption of the print job Jp may include, for example, cleaning of the print head 319, running out of paper (printing medium M), filling-up of a storage tank (ink tank) of waste ink, running out of ink or the like. For example, in FIG. 4, the print job Jp is interrupted at an interruption position Pb. In such a case, if the generation of the print job Jp illustrated in FIG. 3 is executed from the beginning, the waste of the time or the printing medium M that is accompanied by the re-execution of the rendering occur. On the other hand, if the printing is started from the interruption position Pb, there is a possibility that in an image, in which printing is interrupted halfway as in the raster image Ir(8), a difference may occur before and after the interruption position Pb due to a difference in drying time or the like. Therefore, the image processing apparatus 2 has a configuration capable of restarting the print job Jp interrupted in the printer 3 while reducing such problems. In this case, the user can appropriately set the restart state of the print job Jp.

Figure 5:
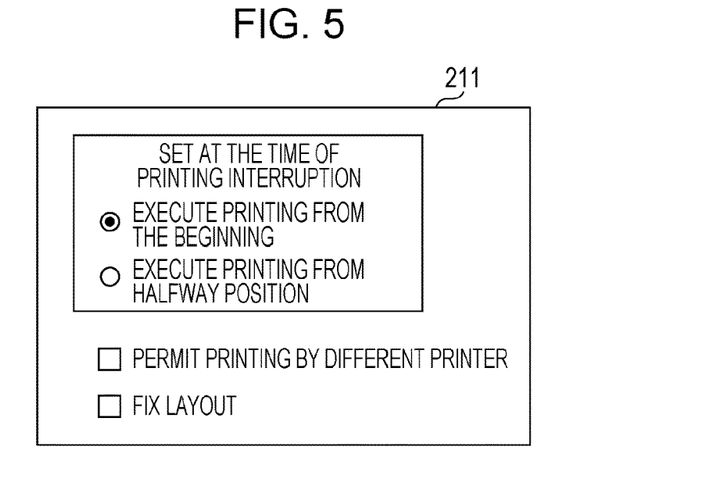
FIG. 5 is a diagram schematically illustrating a setting screen of a restart state of a print job displayed on a UI.

FIG. 5 is a diagram schematically illustrating an example of the setting screen of the restart state of the print job displayed on the UI. In the setting screen 211 illustrated in FIG. 5, when the print job Jp is interrupted, it is possible to select whether to print the print job Jp from the beginning (i.e., whether to print all the images related to the print job Jp) or whether to print the print job Jp from the middle of the print job Jp. In addition, it is possible to select on the setting screen 211 whether a printer 3 (another printer) different from the printer 3 that executes the interrupted print job Jp is permitted to restart the print job Jp. Furthermore, it is possible to select on the setting screen 211 whether to fix a layout of a plurality of images (i.e., whether to maintain the layout of the images in the interrupted print job Jp upon the restart of the print job Jp). The image processing apparatus 2 executes the restart of the print job Jp depending on the selection result by the user.

Figure 6:
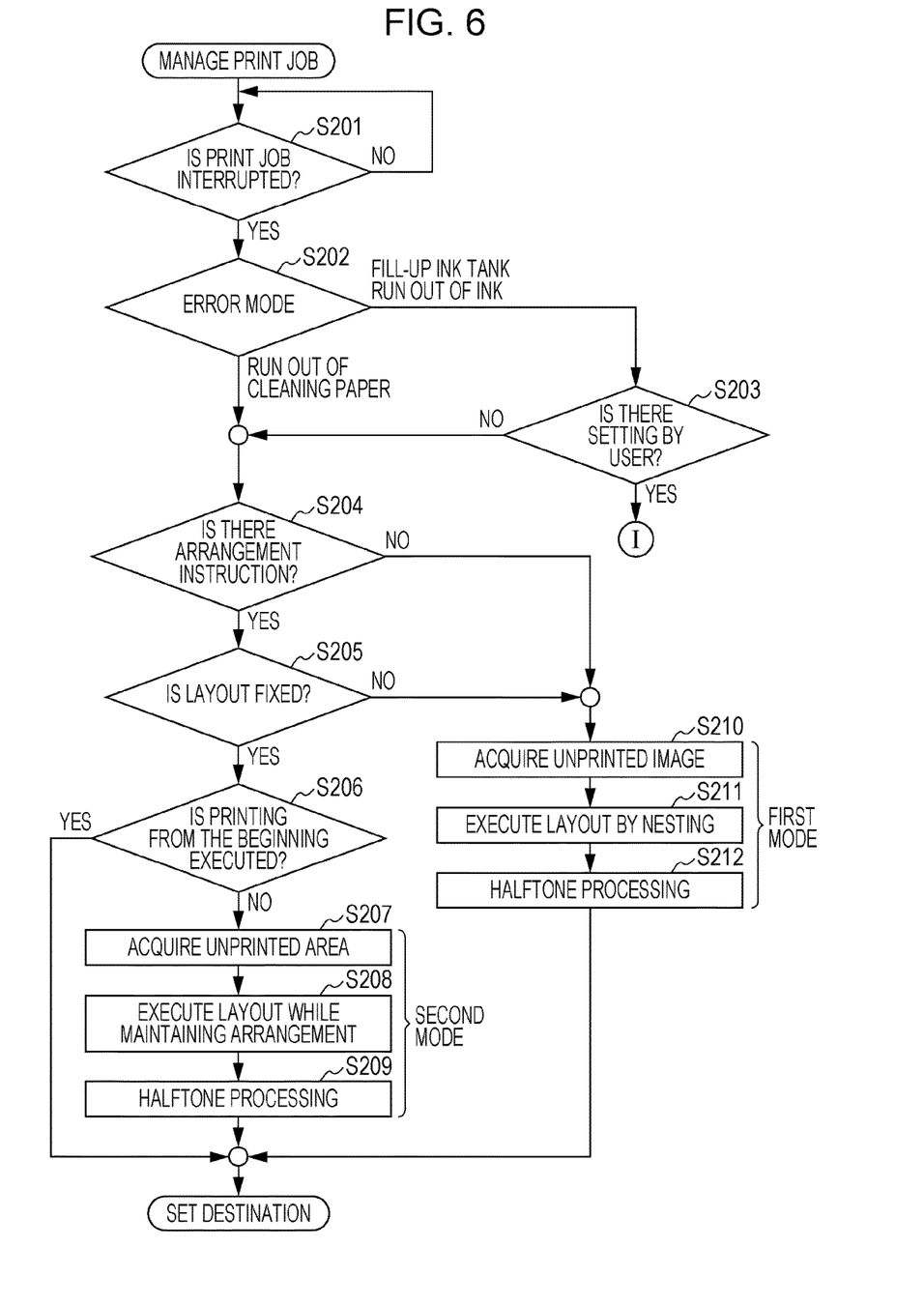
FIG. 6 is a flowchart executed corresponding to an interruption of the print job.
Figure 7:
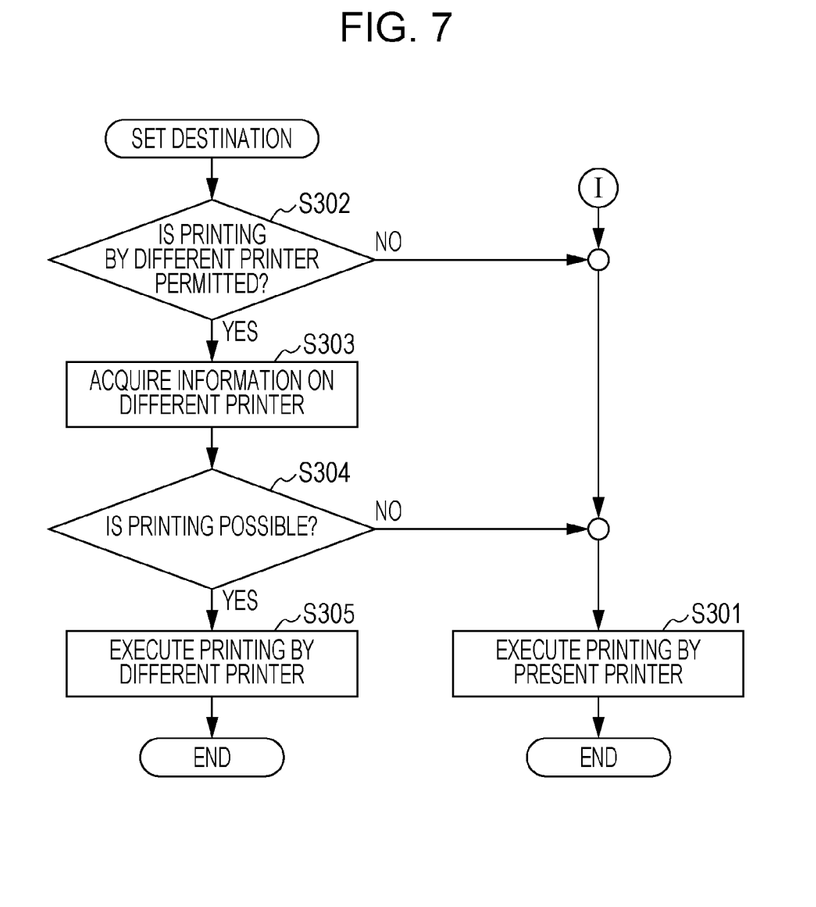
FIG. 7 is a flowchart illustrating a method of determining a printer that executes the restart of the print job.

FIG. 6 is a flowchart illustrating an example of a method of managing a print job executed by an image processing apparatus in response to the interruption of the print job, and FIG. 7 is a flowchart illustrating an example of a method of determining a printer that executes the restart of the print job. The computing section 23 executes the flowcharts illustrated in FIGS. 6 and 7 in accordance with an image processing program 221.

In step S201, the computing section 23, which monitors the execution state of the print job Jp by the printer 3, checks whether the print job Jp is interrupted in the printer 3. If the interruption of the print job Jp is detected ("YES" in step S201), the process proceeds to step S202. The example in which the print job Jp is interrupted at the interruption position Pb in FIG. 4, and the raster images Ir(8), Ir(11), and Ir(12) become unprinted images is illustrated. It should be noted that the unprinted image means the image of which the printing is not completed, and includes the images Ir(11) and Ir(12) of which the printing is not started and the image Ir(8) of which the printing is started but is not completed.

In step S202, the computing section 23 checks an interruption cause (error mode) of the print job Jp. When the interruption cause is filling-up of the ink tank or running out of the ink, the process proceeds to step S203. In step S203, it is determined from an operation history on the setting screen 211 whether there is a user operation on the setting screen 211. When there is a user operation (in the case of "YES" in step S203), it is determined that there is a user who can execute the operation of the printer. The process proceeds to step S301 in FIG. 7 to cause a user to execute maintenance (discarding ink in the ink tank or replenishing ink) and restart the print job Jp. It should be noted that the restart of the print job Jp is executed by the printer 3 (present printer) that executes the print job Jp before interruption. In addition, the restart position (i.e., from which image is printed) of the print job Jp is manually set by the user.

When the interruption cause checked in step S202 is cleaning or running out of paper or when it is determined in step S203 that a user does not execute the operation of the setting screen 211 (in the case of "NO" in step S203), the process proceeds to step S204. In step S204, the presence or absence of the arrangement instruction (group division instruction or arrangement change instruction) by the user is checked. When there is the arrangement instruction (in the case of "YES" in step S204), it is checked on the setting screen 211 whether a check box of the "fix layout" is selected (step S205). When the "fix layout" is selected (in the case of "YES" in step S205), it is checked on the setting screen 211 whether the "printing from the beginning" is selected (step S206). When the "printing from the beginning" is selected (in the case of "YES" in step S206), the process proceeds to setting of a destination in FIG. 7.

Figure 8:
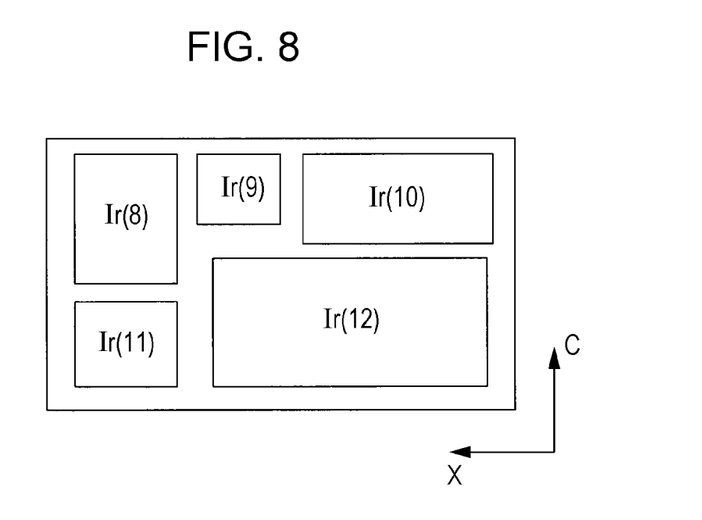
FIG. 8 is a diagram schematically illustrating a state of a rearrangement of raster images.

On the other hand, when the "printing from the beginning" is not selected (in the case of "NO" in step S206), the process proceeds to step S207. In step S207, the arrangement determination section 323 acquires an unprinted area Rfn (FIG. 4) closest to the unprinted images Ir(8), Ir(11), and Ir(12) from an upstream side in the transporting direction C of the unprinted images Ir(8), Ir(11), and Ir(12). The arrangement determination section 232 performs layout of the raster images Ir(8) to Ir(12) on an upstream side in the transporting direction C of the unprinted area Rfn. At this time, these raster images Ir(8) to Ir(12) are rearranged while maintaining the arrangement of the raster images Ir(8) to Ir(12) among the plurality of raster images Ir(1) to Ir(12) in the print job Jp generated in the generating of the print job of FIG. 3 (step S208). As a result, the raster images Ir(8) to Ir(12) are arranged as illustrated in FIG. 8. Here, FIG. 8 is a diagram schematically illustrating a state of the rearrangement of the raster images. Next, the halftone execution section 233 performs half-tone processing on the raster images Ir(8) to Ir(12), which are laid out in step S208, to generate a reprint job Jrf instructing printing of the raster images Ir(8) to Ir(12) (step S209). The process proceeds to the setting of the destination in FIG. 7.

Figure 9:
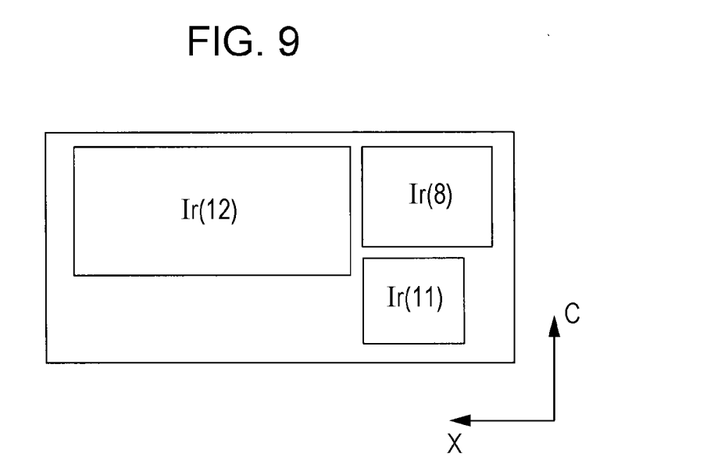
FIG. 9 is a diagram schematically illustrating another state of the rearrangement of the raster images.

On the other hand, when it is checked in step S204 that there is no arrangement instruction (in the case of "NO") and when it is checked in step S205 that the "fix layout" is not selected (in the case of "NO"), the process proceeds to step S210. In step S210, the arrangement determination section 232 acquires the unprinted images Ir(8), Ir(11), and Ir(12). The layout of the unprinted images Ir(8), Ir(11), and Ir(12) is executed by the nesting (step S211). As a result, the raster images Ir(8), Ir(11), and Ir(12) are rearranged as illustrated in FIG. 9. Here, FIG. 9 is a diagram schematically illustrating another state of the rearrangement of the raster images. Next, the halftone execution section 233 performs the halftone processing on the raster images Ir(8), Ir(11), and Ir(12), which are laid out in step S211, to generate a reprint job Jrl instructing printing of the raster images Ir(8), Ir(11), and Ir(12) (step S212). The process proceeds to the setting of the destination in FIG. 7.

The setting of the destination in FIG. 7, it is confirmed on the setting screen 211 whether the check box of the "permit printing by different printer" is selected (step S302). When the printing by the different printer is not permitted (in the case of "NO" in step S302), the process proceeds to step S301. In step S301, the printing is executed by the printer 3 (present printer) that is executing the interrupted print job Jp.

Meanwhile, when the printing by the different printer is permitted (in the case of "YES" in step S302), the process proceeds to step S303. In step S303, the information on the different printer (printer 3 different from the printer 3 that is executing the interrupted print job Jp) connected to the image processing apparatus 2, is acquired. It is determined whether the printing by the different printer can be executed (step S304). Specifically, the following matters are confirmed:

The power of the different printer 3 is turned on

Calibration is being executed in the different printer 3

The characteristics of ink of the different printer 3 match the characteristics of ink of the present printer 3

The quality (resolution) of printing of the different printer 3 matches the quality (resolution) of the present printer 3

The characteristics of the printing medium M of the different printer 3 match the characteristics of the printing medium of the present printer 3.

When all matters are satisfied, it is determined that printing can be executed by the different printer 3 ("YES" in step S304), and when any one of the matters is not satisfied, it is determined that printing cannot be executed by the different printer 3 ("NO" in step S304). If "YES" is determined in step S304, the process proceeds to step S305 to allow the different printer 3 to execute printing, whereas if "NO" is determined in step S304, the process proceeds to step S301 to allow the present printer 3 to execute printing.

According to the embodiment described above, the nesting (optimization processing) is performed on the plurality of raster images Ir(1) to Ir(12) to generate the print job Jp instructing a printer to print the plurality of nested raster images Ir(1) to Ir(12) on which the nesting is performed. When the interruption of the print job Jp is detected, a first mode (steps S210 and S211) is executed. The first mode re-executes the nesting on the unprinted images Ir(8), Ir(11), and Ir(12) to generate a reprint job Jrl (reprint job) instructing the printing of the unprinted images Ir(8), Ir(11), and Ir(12) on which the nesting is re-executed. Accordingly, even when the print job Jp is interrupted, it is unnecessary to execute the print job Jp again from the beginning. In addition, in steps S210 and S211, since the arrangement of the print images Ir(8), Ir(11), and Ir(12) is optimized by the nesting, it is also possible to reduce the waste of the printing medium M. In this way, even when the print job Jp is interrupted, it is possible to efficiently execute the print job Jp.

In addition, when the interruption of the print job Jp is detected, it is possible to selectively execute the first mode or the second mode (steps S207 to S209). The second mode generates a reprint job Jrf (reprint job) instructing the printing of the unprinted images Ir(8), Ir(11), and Ir(12) while maintaining the arrangement of the unprinted images Ir(8), Ir(11), and Ir(12) among the plurality of raster images Ir(1) to Ir(12) in the print job Jp. In such a configuration, for example, it is possible to execute the reprint jobs Jrl and Jrf in an state of higher versatility such as selecting the first mode when it is important to reduce the waste of the printing medium M and selecting the second mode when it is important to arrange the plurality of raster images Ir(1) to Ir(12) appropriately.

In addition, the UI 21, to which a user is able to input an arrangement instruction of arranging the images, is provided, and the computing section 23 can execute the arrangement adjustment that adjusts the arrangement of the plurality of raster images Ir(1) to Ir(12) based on the arrangement instruction. The first mode is executed when the arrangement adjustment is not executed. Thus, it is possible to restrain the arrangement instruction of the user from being canceled due to the execution of the first mode.

In addition, the second mode is executed when the arrangement adjustment is executed based on the arrangement instruction. In such a configuration, it is possible to restrain the arrangement of the unprinted images Ir(8), Ir(11), and Ir(12) from being changed against the arrangement instruction of the user.

In addition, change permission information (fixing of the layout) indicating whether the arrangement of the images instructed by the arrangement instruction can be changed can be input to the setting screen 211 of the UI 21. When the arrangement adjustment is executed, the mode to be executed out of the first mode and the second mode is selected based on the change permission information. Specifically, when the layout is not fixed, the first mode is executed, whereas when the layout is fixed, the second mode is executed. Accordingly, it is possible to execute the appropriate mode (first mode or second mode) according to the user's intention.

Further, it is possible to input the setting instruction (group division instruction) of the unprinted area Rf to the UI 21. When there is the group division instruction, the raster images Ir(1) to Ir(12) are arranged avoiding the unprinted area Rf. In addition, in the second mode executed when the print job Jp is interrupted, the reprint job Jrf, which instructs the printing of the raster images Ir(8) to Ir(12) on the upstream side in the transporting direction C from the unprinted area Rfn closest to the unprinted images Ir(8), Ir(11), and Ir(12) on the downstream side in the transporting direction C of the unprinted images Ir(8), Ir(11), and Ir(12), is generated. That is, when the print job Jp is interrupted, since printing is started from the unprinted area Rfn closest to the unprinted images Ir(8), Ir(11), and Ir(12), it is possible to execute the reprint job Jrf while maintaining the positional relationship of the unprinted images Ir(8), Ir(11), and Ir(12) even without executing the printing of all the raster images Ir(1) to Ir(12) related to the print job Jp again.

In addition, when the present printer 3 executing the print job Jp cannot be used (in the case of "cleaning and running out of paper" in step S202), the different printer 3 executes the reprint jobs Jrl and Jrf (step S305). As a result, even if the present printer 3 that is executing the print job Jp cannot be used, the reprint jobs Jrl and Jrf can be executed.

As described above, in the above embodiment, the printing system 1 corresponds to an example of the "printing system" of the invention, the image processing apparatus 2 corresponds to an example of the "image processing apparatus" of the invention, the image processing program 221 corresponds to an example of the "image processing program" of the invention, the printer 3 corresponds to an example of the "printer" of the invention, the computing section 23 corresponds to an example of the "print job generator", the "interruption detector", and the "reprint job generator" of the invention, the nesting corresponds to an example of the "optimization processing" of the invention, the raster images Ir(1) to Ir(12) correspond to an example of the "plurality of images" of the invention, the unprinted images Ir(8), Ir(11), and Ir(12) correspond to an example of the "unprinted images" of the invention, the print job Jp corresponds to the "print job" of the invention, the reprint job Jrl corresponds to an example of the "reprint job" and the "first reprint job" of the invention, respectively, the reprint job Jrf corresponds to an example of each of the "reprint job" and the "second reprint job" of the invention, respectively, the first mode of steps S210 to S212 corresponds to an example of the "first mode" of the invention, the second mode of steps S207 to S209 corresponds to an example of the "second mode" of the invention, the UI 21 is an example of the "arrangement input section" of the invention, the "fix layout" on the setting screen 211 corresponds to an example of the "change permission information" of the invention, the printing medium M corresponds to an example of the "printing medium" of the invention, the transporting direction C corresponds to an example of the "first direction" of the invention, the scanning direction X corresponds to an example of the "second direction" of the invention, the unprinted area Rf corresponds to an example of the "unprinted area" of the invention, the present printer 3 corresponds to an example of the "printer" of the invention, and the different printer 3 corresponds to an example of "another printer" of the invention.

It should be noted that the invention is not limited to the above embodiment and various modifications can be made to those described above without departing from the gist thereof. For example, the setting screen 211 illustrated in FIG. 5 may not be provided. When setting screen 211 is not provided, steps S205 and S206 may be omitted in the flowchart of FIG. 6.

In addition, it is not necessarily able to set the unprinted area Rf at the time of the nesting. If there is no function of setting the unprinted area Rf, steps S207 to S209 may be omitted.

In addition, the number of images or the like in FIG. 4 is merely an example, and the above embodiment can be similarly applied even to different numbers of images.

What is claimed is:

1. An image processing apparatus, comprising:
a print job generator configured to perform optimization processing for optimizing an arrangement of a plurality of images and generate a print job instructing a printer to print the plurality of images on which the optimization processing is performed;
an interruption detector configured to detect an interruption of the print job;
a reprint job generator configured to generate a reprint job instructing the printer to print unprinted images, of which printing is not completed, among the plurality of images if the interruption detector detects the interruption of the print job;
an arrangement input section to which a user inputs an instruction of arranging the images,
wherein the reprint job generator executes a first mode that performs the optimization processing on the unprinted images, of which the printing is not completed, among the plurality of images and generates, as the reprint job, a first reprint job instructing the printer to print the unprinted images on which the optimization processing is performed,
wherein if the interruption detector detects the interruption of the print job, the reprint job generator selectively executes the first mode or a second mode, which generates, as the reprint job, a second reprint job instructing the printer to print the unprinted images while maintaining the arrangement of the unprinted images among the plurality of images in the print job,
wherein the print job generator executes an arrangement adjustment that adjusts an arrangement of the plurality of images based on the instruction of arranging the images, and
wherein the reprint job generator executes the first mode when the print job generator does not execute the arrangement adjustment.

2. The image processing apparatus according to claim 1, wherein
the reprint job generator executes the second mode when the print job generator executes the arrangement adjustment.

3. The image processing apparatus according to claim 1, wherein
the arrangement input section receives change permission information, input by the user, indicating whether to change the arrangement of the images determined by the instruction of arranging the images, and
the reprint job generator selects a mode to be executed out of the first mode and the second mode based on the change permission information when the print job generator executes the arrangement adjustment.

4. The image processing apparatus according to claim 1, wherein
the interruption detector detects the interruption of the print job in the printer that prints the images on a printing medium while transporting the printing medium in a first direction to execute the print job,
the arrangement input section receives, as the instruction of arranging the images, a setting instruction of an unprinted area extending through the printing medium in a second direction orthogonal to the first direction,
the print job generator avoids the unprinted area and arranges the images when there is the setting instruction, and
the reprint job generator generates the second reprint job instructing the printer to print the images on an upstream side in the first direction of the unprinted area closest to the unprinted images on an downstream side in the first direction of the unprinted images and executes the second mode.

5. The image processing apparatus according to claim 1, wherein
the reprint job generator allows another printer different from the printer to execute the reprint job when the printer that executes the print job is not available to be used.

6. A non-transitory computer-readable storage medium storing an image processing program causing a computer to execute a process comprising:
performing optimization processing for optimizing an arrangement of a plurality of images and
generating a print job instructing a printer to print the plurality of images on which the optimization processing is performed;
detecting an interruption of the print job;
selectively executing, if the interruption of the print job is detected, a first or a second mode that performs the optimization processing on unprinted images, of which printing is not completed, among the plurality of images and generates a first reprint job based on the first mode instructing the printer to print the unprinted images on which the optimization processing is performed, or a second reprint job based on the second mode instructing the printer to print the unprinted images while maintaining the arrangement of the unprinted images among the plurality of images in the print job;
executing an arrangement adjustment that adjusts an arrangement of the plurality of images based on an input instruction of arranging the images; and
executing the first mode when the arrangement adjustment is not executed.

7. A printing method, comprising:
performing optimization processing for optimizing an arrangement of a plurality of images and generating a print job instructing a printer to print the plurality of images on which the optimization processing is performed;

executing, by a printer, the print job;

detecting an interruption of the print job;

selectively executing, if the interruption of the print job is detected, a first or a second mode that performs the optimization processing on unprinted images, of which printing is not completed, among the plurality of images and generates a first reprint job based on the first mode instructing the printer to print the unprinted images on which the optimization processing is performed, or a second reprint job based on the second mode instructing the printer to print the unprinted images while maintaining the arrangement of the unprinted images among the plurality of images in the print job;

executing an arrangement adjustment that adjusts an arrangement of the plurality of images based on an input instruction of arranging the images;

executing the first mode when the arrangement adjustment is not executed; and executing, by the printer, the first or second reprint job.

* * * * *